United States Patent
Pigott

(10) Patent No.: US 7,800,350 B2
(45) Date of Patent: Sep. 21, 2010

(54) APPARATUS FOR OPTIMIZING DIODE CONDUCTION TIME DURING A DEADTIME INTERVAL

(75) Inventor: John M. Pigott, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 741 days.

(21) Appl. No.: 11/747,360

(22) Filed: May 11, 2007

(65) Prior Publication Data

US 2008/0278125 A1 Nov. 13, 2008

(51) Int. Cl.
G05F 1/40 (2006.01)
(52) U.S. Cl. ...................................... 323/271
(58) Field of Classification Search .......... 323/265, 323/271, 282; 363/16
See application file for complete search history.

(56) References Cited

U.S. PATENT DOCUMENTS

| 5,481,178 | A  | * | 1/1996  | Wilcox et al. ........... 323/287 |
| 5,731,694 | A  | * | 3/1998  | Wilcox et al. ........... 323/287 |
| 5,764,024 | A  | * | 6/1998  | Wilson ................... 318/805 |
| 6,249,111 | B1 | * | 6/2001  | Nguyen .................. 323/282 |
| 7,327,127 | B2 | * | 2/2008  | Ho ....................... 323/271 |
| 7,358,711 | B2 | * | 4/2008  | Sutardja et al. ......... 323/283 |
| 7,368,898 | B2 | * | 5/2008  | Sutardja et al. ......... 323/285 |
| 7,411,377 | B2 | * | 8/2008  | Sutardja et al. ......... 323/282 |
| 2001/0036085 | A1 | | 11/2001 | Narita |
| 2002/0039017 | A1 | | 4/2002  | Massie et al. |
| 2002/0074976 | A1 | | 6/2002  | Kunii et al. |
| 2005/0167599 | A1 | * | 8/2005  | Schlyer et al. ......... 250/363.03 |

OTHER PUBLICATIONS

Application Note 735 Layout Considerations for Non-Isolated DC-DC Converteres, Maxim Integrated Products and Dallas Semiconductor, Mar. 1, 2001 , http://www.maxim-ic.com/appnotes.cfm/appnote_number/735.
Application Note 725 DC/DC Conversion without Inductors,Maxim Integrated Products and Dallas Semiconductor, Dec. 29, 2000, http://www.maxim-ic.com/appnotes.cfm/appnote_number/735.
Application Note 2031 "DC-DC Converter Tutorial", Maxim Integrated Products and Dallas Semiconductor, Oct. 19, 2000, http://www.maxim-ic.com/appnotes.cfm/appnote_number/2031.
TPS54110, "3-V to 6-V input, 1.5-A Output Synchronous-Buck PWM Switcher with Integrated FETs (Swift)", Dec. 2003, revised Oct. 2005, http://www.ti.com/lit/gpn/tps54110.

* cited by examiner

*Primary Examiner*—Adolf Berhane
*Assistant Examiner*—Yemane Mehari
(74) *Attorney, Agent, or Firm*—Ingrassia, Fisher & Lorenz, P.C.

(57) ABSTRACT

Deadtime optimization techniques and circuits are provided which implement closed loop feedback to reduce a duration of a deadtime interval by reducing a diode conduction time (DCT) to an optimized or minimized value. Information regarding DCT is fed back to continuously adjust the relative delay between a first driver path which drives a first transistor and a second driver path which drives a second transistor. For instance, information regarding DCT can be measured and stored, and then used to generate a control signal which continuously adjusts (e.g., increases or decreases) a variable delay associated with a delay element in one of the driver paths of one of the transistors. The delay is adjusted to a value which drives the DCT towards an optimum value. By continuously changing the relative delay between the first driver path and the second driver path, the DCT can be driven to an optimum value.

20 Claims, 7 Drawing Sheets

APPARATUS FOR OPTIMIZING DIODE CONDUCTION TIME DURING A DEADTIME INTERVAL

TECHNICAL FIELD

Embodiments of the subject matter described herein relate generally to power converters. More particularly, embodiments of the subject matter relate to improving the efficiency of power converters, such as DC-to-DC converters, by optimizing diode conduction time during a deadtime interval.

BACKGROUND

A DC-to-DC converter is a circuit or device which converts DC power from one voltage to another voltage. A DC-to-DC converter accepts a DC input voltage and produces a DC output voltage. Typically the DC output voltage produced is at a different voltage level than the DC input voltage. For instance, a DC-to-DC converter may convert a relatively high input battery voltage to a lower DC output voltage, or vice versa, and in some cases converts the input battery voltage to a negative DC output voltage.

DC-to-DC converters are important in many portable battery-operated electronic devices, such as cellular phones and laptop computers, which are supplied with power from batteries. Such electronic devices often contain several sub-circuits with each sub-circuit requiring a unique DC voltage level from that supplied by the battery. Most battery-operated devices include many different DC-to-DC converters with each DC-to-DC converter generating a controlled DC voltage from a single variable battery voltage. By implementing multiple DC-to-DC converters to generate and control appropriate DC voltages at different points in the circuit space can be saved instead of using multiple batteries to supply different parts of the device.

FIG. 1A is a circuit schematic which illustrates a conventional DC-to-DC converter 100. The DC-to-DC converter 100 consists of a pulse width modulated (PWM) clock 110, an output power switch stage 165, an external LC filter 170 and a feedback loop which includes an error amplifier 198 coupled between an output of the LC filter 10 and the clock 110.

The clock 110 generates a clock signal at a certain frequency and provides it to the power switch stage 165. The power switch stage 165 includes a first (or high-side) PMOS transistor 140 and a second NMOS (or low-side) transistor 150. The transistors 140, 150 each have a parasitic "body" diode 142, 152 in parallel, respectively. The first transistor 140 is couple between an input voltage (Vin) source 133 and a first node 145, whereas the second transistor 150 is coupled between the first nod 145 and ground. Both transistors 140, 150 receive the clock signal as the input at their gate electrode. The clock signal causes the transistors 140, 150 to alternately turn on or turn off, and only one is on at a give time. The transistors 140, 150 to alternately turn on and off with some uncertain or variable delay between receiving the command to turn on/off an the actual turn on/off. When the transistor 140 turns on and the transistor 150 turns off, the transistor 140 generates a high output voltage at the first node 145 which is approximately equal to the input voltage (Vin). When the transistor 140 turns off and the transistor 150 turns on, the transistor 150 generates a low output voltage at the firs ode 145 which is approximately equal to zero volts. In some implementations, the transistors 140, 150 switch on and off at a frequency of approximately on megahertz (MHz). The turn-on and turn-off characteristics of the transistors 140, 150 depend on a variety of factors which can vary with time such as the supply voltages, the temperature, and other variables.

The respective outputs of the first transistor 140 and the second transistor 150 are combined at the first node 145 to generate a square wave voltage (V1). The LC filter 170 include an inductor 160 which is coupled between the first nod 145 and a second node 161, and a capacitor 162 coupled between the second node 161 and ground. The LC filter 170 filters the square wave voltage (V1) to provide a DC output voltage (Vout) at the second node 161. For example, in a scenario where the DC-to-DC converter 100 is required to provide a 2.5 volt voltage at Vout, a duty cycle of the transistors 140, 150 would be 50% so that only the first transistor 140 would be on one-half the time (e.g., providing 5 volts at V1) and only the second transistor 150 would be one-half of the time (e.g., providing 0 volts at V1) Thus, the average output voltage (Vout) at node 161 would be 2.5 volts after passing through the LC filter 170.

To generate and maintain an appropriate DC output voltage (Vout) at a desired level, the feedback loop controls the duty cycle of the clock signal generated by the clock 110 to continuously adjust the duty cycle of the transistors 140 and 150. The error amplifier 198 in the feedback loop receives the actual output voltage (Vout), compares it to a stable reference voltage (Vref) (which is the desired value of the output voltage (Vout)), and generates an error voltage control signal 199 which represents the difference between the actual output voltage (Vout) and the stable reference voltage (Vref). The control signal 199 continuously adjust the actual output voltage (Vout) towards the desired reference voltage (Vref) by changing the duty cycle of the clock 110. This way, the duty cycle of the transistors 140, 150 ensures that the actual output voltage (Vout) is driven to the desired reference voltage (Vref). For instance, when the actual output voltage (Vout) is too high, the control signal 199 reduces the duty cycle of the clock 110 to adjust the duty cycle of the transistors 140, 150 so that the output voltage (Vout) reaches the desired value of the output voltage (Vref).

FIG. 1B is a graph of a waveform which is a simplified representation of the voltage (V1) signal 110 at the first node 145 as a function of time (t). The voltage (V1) signal 110 is substantially periodic and has a period (T). Each interval of the period (T) consists of two subintervals—(t1) and (t2). The time interval (t1) represents the time when the voltage (V1) is either at a low voltage (e.g. below 2.5 volts) or negative voltage (e.g., −0.6 volts), an the time interval (t2) represents the time when the voltage (V1) is at a high level (e.g., above 2.5 volts). The ratio of time interval (t2) to the period (T) is the duty cycle of the voltage (V1). In FIG. 1B, the voltage (V1) is initially at 5 volts. When the transistors 140, 150 receive their respective clock signals, the first transistor 140 switches off and the second transistor 150 begins the process of turning on. Turning the first transistor 140 off causes the voltage (V1) to transition from the high level to the negative level (e.g., −0.6 volts), where the voltage (V1) remains there until the second transistor 150 turns on causing the voltage (v1) to rise to the low level.

If the first transistor 140 and second transistor 150 are simultaneously turned on, even if only for a short interval, a short circuit can occur across the supply. For example, after the second transistor 150 receives the clock signal it may take only five nanoseconds to turn on, but it may take ten nanoseconds to turn off the first transistor 140. Turning the second transistor 150 on before the first transistor 140 is completely turned off can result in the second transistor 150 actually turning on while the first transistor 140 is still turned on. To prevent this scenario, a "deadtime" interval 112 is provided to ensure that a sufficient amount of time elapses between the clock signal to turn of the first transistor 140 and the clock signal to turn on the second transistor 150. (The deadtime interval 112 represents the duration which occurs between the first transistor 140 turning off and the second transistor 150 turning on.) The deadtime interval 112 on the falling edge helps ensure that an adequate time passes after the first transistor 140 has been turned off before the second transistor 150 turns on so that the transistor 140, 150 are not on simultaneously. Absence of the deadtime interval 112 would imply cross conduction of the transistors 140, 150 which is undesirable. In one implementation, the deadtime interval 112 can be approximately 10 to 20 nanoseconds. At the start of the deadtime interval 112, the output voltage (V1) starts off at the high level (e.g., 5 volts) and then decreases to the negative voltage (e.g., −0.6 volts) when the first transistor 140 turns off. After a time period (e.g., ten nanoseconds), the second transistor 150 begins conducting, and the output voltage (V1) returns to the low voltage (e.g., −0.1 volts between the deadlines 112, 114) which is equal to the current flowing through the inductor 360 multiplied by the on-resistance of the second transistor 150.

Thereafter, when the second transistor 150 turns off and the fist transistor 140 has not yet turned on, the output voltage (V1) drops to the negative voltage (e.g., −0.6 volts) and remain at the negative voltage (e.g., −0.6 volts) for the second deadtime interval 114. During the next clock cycle, after a sufficient deadtime interval 144 to ensure that the second transistor 150 has turned off, the first transistor 1540 turns on again, and the output voltage (V1) returns to the high level (e.g., approximately 5.0 volts since the transistor 140 has an on resistance which reduces the voltage (V1)).

Many electronic devices operate on battery power. To increase device lifetime on a single battery charge, it is important to increase the operating efficiency of the DC-to-DC converter 100. (e.g., an efficient conversion of input DC voltage to voltage to output DC voltage). Because battery resources are consumed excessively and are wasted during the deadtime intervals 112 and 114, to increase battery and device lifetime it is desirable to reduce the deadtime interval (s) 112, 114 as much as possible.

Accordingly, it is desirable to provide techniques for optimizing battery life in an electronic device by automatically reducing deadtime intervals(s) to an optimized value/ Furthermore, other desirable features and characteristics will become apparent from the subsequent detailed description and the appended claims, taken in conjunction with the accompanying drawing and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1A:
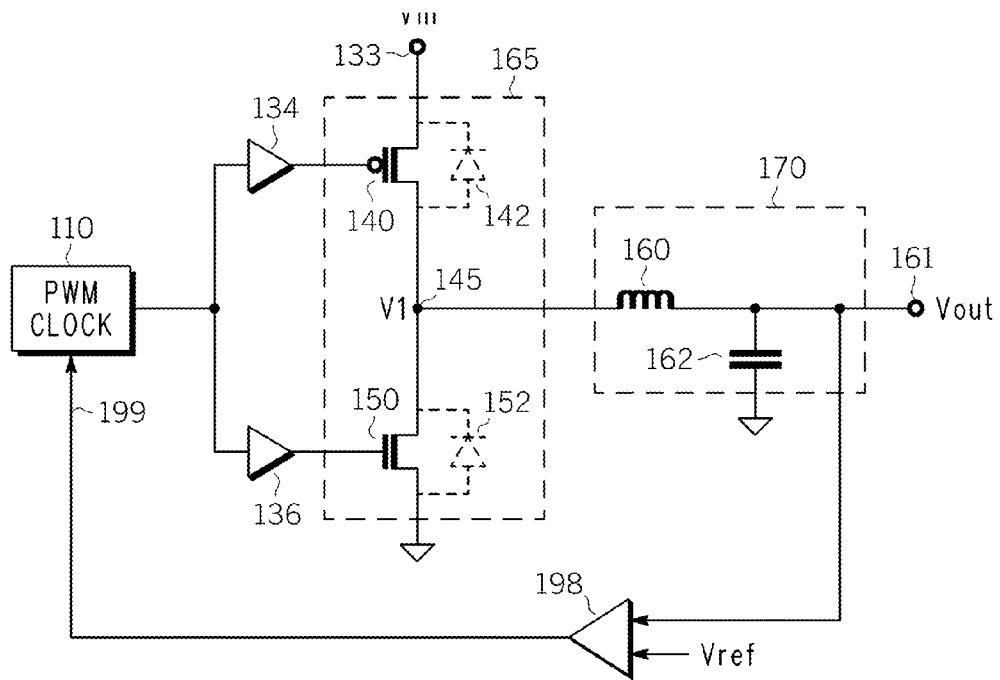
FIG. 1 is a circuit schematic which illustrates a conventional DC-to-DC converter.
FIG. 1B is a graph of a waveform which represents a simplified version of voltage (V1) signal at the first node as a function of time (t)
FIG. 1C is a graph which represents the voltage (V1) signal as a function of time (t) including more detail regarding how the voltage (V1) transitions during a deadtime interval.

The following detailed description is merely exemplary in nature and is not intended to limit the invention or the application and uses of the invention. The word "exemplary" is used herein to mean "serving as an example, instance, or illustration." Any embodiment described herein as "exemplary" is not necessarily to be construed as preferred or advantageous over other embodiment. All of the implementation described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configure to perform the specified functions. For example, an embodiment of a system or a component may employ various integrated circuit components, e.g., memory elements, digital signal processing elements, logic elements, look-up tables, or the like, which may carry out a variety of function under the control of one or m ore microprocessors or other control devices. In addition, those skilled in the art will appreciate that embodiments described herein are merely exemplary implementations.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element.

The connecting lines shown in the various figures contained herein are intended to represent example functional relationships and/or physical couplings between the various elements. It should be noted that many alternative or additional functional relationships or physical connection may be present in other embodiments of the subject matter. The following description refers to elements or nodes or features being "connected" or "coupled" together. As used herein, unless expressly stated otherwise. "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics illustrated in FIG. 2, 4, 6 and 8 depict an exemplary arrangement of elements, additional intervening elements, devices, features, or components may be present in embodiments of the depicted subject matter.

Figure 1B:
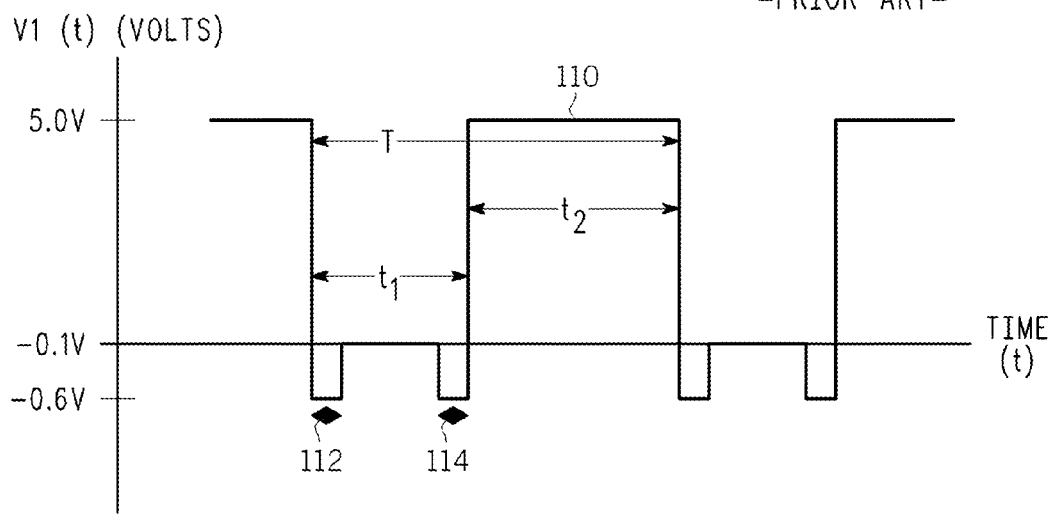

FIG. 1B, the voltage (V1) signal 110 illustrated as instantaneously transitioning from the high level (e.g.; 5.0 volts) down to the negative voltage (e.g., −0.6 volts). In reality the transition is more complex as will not be described with reference to FIG. 1C.

Figure 1C:
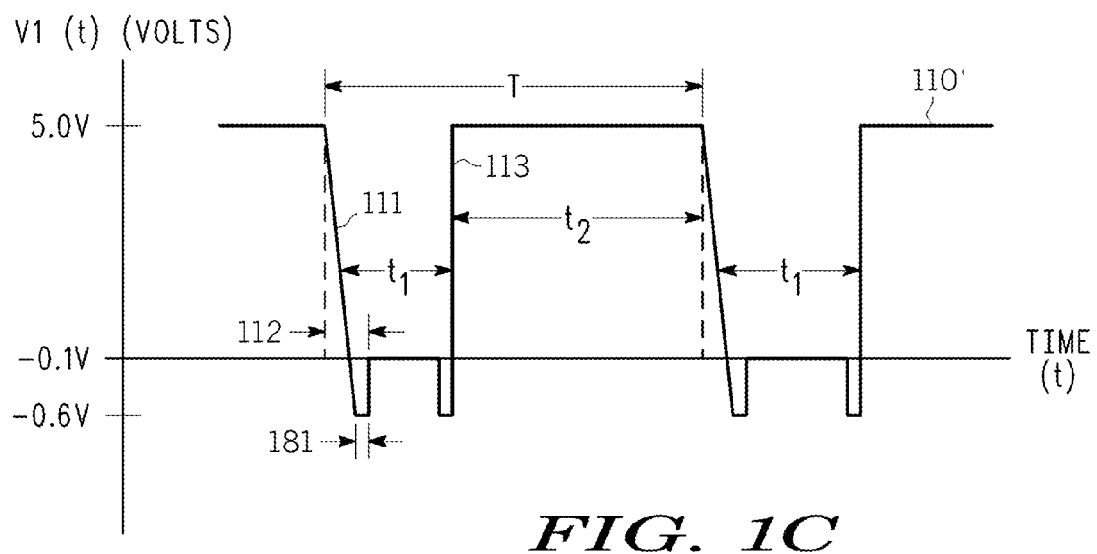

FIG. 1C is a graph which represents the voltage (V1) signal 110 as a function of time (t) including how the voltage (V1) transitions during the deadtime interval 112. When the first transistor 140 is turned on a current flows from a power supply (Vin) through the first transistor 140 and into the inductor 160 to the output node 161. Although the deadtime interval 112 is needed, it would be desirable to reduce the duration of the deadtime interval 112 to an optimized value to help improve operating efficiency and save energy (e.g., battery power).

As illustrated in FIG. 1C, the voltage (V1) begins at a high level (e.g., approximately 5.0 volts in this implementation), and when the first transistor 140 turns off, the voltage (V1) begins a transition 111 o the negative voltage (e.g., −0.6 volts in this implementation). The transition 111 is characterized by a slope which represents the rate at which the voltage (V1) is changing as a function of time; this slope depends on a current flowing thought the inductor 160 and a parasitic capacitance (not shown) at the node 145. After the transition 111, the inductor 160 a current flow through parasitic diode 252 the second transistor 150. The voltage (V1) remains at the negative voltage (e.g., −0.6 volts) for an interval 181 until the second transistor 150 turns on. To explain further, when the voltage (V1) reaches −0.6 volts, during the diode conduction time (DCT) interval 181 the parasitic diode 152 conducts a current through the inductor 160. The DCT interval 181, occurs during a period when the first transistor 140 has turned off but before the second transistor 150 has been switched on. When transistor 150 turns on (e.g., the DCT 181 ends), the diode 152 stops conducting, and the voltage (V1) increases to the low level, (e.g., −0.1 volts in this example).

The voltage during DCT 181 is determined by the forward voltage drop of the diode 152. In this example, the DCT 181 causes an extra 0.6 volt drop during the entire DCT which wastes energy (e.g., battery power). Since the DCT 181 wastes energy, it is desirably to provide techniques for reducing the DCT 181 of the deadtime interval 112 to an optimized or minimized value.

Overview of Exemplary Embodiments

To improve the efficiency of power conversion in power converter, such as a DC-to-DC converter, or a Class-D audio driver circuit, or a motor driver circuit, or other circuits which implement a power switch stage including two or more transistors, deadtime optimization techniques and circuits are provide for reducing the duration of a deadtime interval to a suitable small value. The deadtime optimization techniques and circuits implement closed loop feedback to reduce the duration of a deadline interval by reducing a diode conduction time (DCT) to an optimized or minimized value. Information regarding DCT is feedback to continuously adjust the relative delay between a first driver path which drives a first transistor and a second driver path which drives a second transistor to manipulate the delays between respective drive signals provided to the transistors. In one embodiment, information regarding DCT is measured and stored, and then used to generate a control signal. The control signal continuously adjusts (e.g., increases or decreases) a variable delay associated with a delay element in one of the driver patch of one of the transistors to a value which drives the DCT towards an optimum non-zero value which approaches zero. By continuously changing the relative delay between the first driver path and the second driver path, the DCT is driven to an optimum non-zero value. In other words, the control signal continuously changes the variable delay in a direction to optimized or minimize the DCT pulse width. By reducing the duration of the DCT, energy is saved and efficiency of the system can be improved. This is particularly important, for example, in battery operated devices since it can help extend battery lifetime.

In one embodiment, a method is provided in which a clock signal is provided to a first delay element and a second delay element, and a first voltage (V1) is generated which includes a deadtime interval that comprises a pulse. Providing the clock signal to the first delay element causes it to generate a first delayed clock signal, whereas providing the clock signal to the second delay element causes it to generate a second delayed clock signal. The first delayed clock signal drives a first transistor to generate a first output signal at a first time, and the second delayed clock signal is received by a second transistor at a second time. The first transistor turns off and stops conducting in response to the first delayed clock signal at the first time. At a third time, the second transistor and turns on begins conducting in response to the second delayed clock signal to generate a second output signal. The first voltage (V1) is generated by combining the first output signal and the second output signal, and include the deadtime interval which occurs between the first time and the third time. The second transistor has a parasitic diode associated therewith which conducts a current during a portion of the deadtime interval to cause a pulse in the first voltage (V1) between the second time and the third time.

According to the method, the pulse is detected during a first clock cycle, and the duration of the pulse is measured to generate a diode conduction time. In one implementation the pulse can be detected by comparing the first voltage (V1) to a threshold voltage, and generating a diode conduction time output signal when the first voltage (V1) is les than the threshold voltage. The measure diode conduction time is stored as a stored diode conduction time until the next cycle. Based on the stored diode conduction time a control signal is generated which changes a relative delay between the first delay element and the second delay element to change the diode conduction time to an optimum non-zero value during a subsequent clock cycle after the first clock cycle. For instance, in one exemplary embodiment, where the first delay element is a fixed delay element which delays the first delayed clock signal by a fixed duration, and the second delay element is a variable delay element which delays the clock signal by a variable delay, the control signal changes the variable delay of the second variable delay element to change the relative delay between the fixed delay element and the variable delay element so that the diode conduction time is driven towards the optimum non-zero value during the next clock cycle. The control signal can either decrease the variable delay to decrease the diode conduction time during the next clock cycle, or increase the variable delay to increase the diode conduction time during the next clock cycle.

In the exemplary embodiments which will now be described, the deadtime optimization techniques and technologies will be described as applied to improve efficiency of a DC-to-DC converter. However, it will be appreciated by those skilled in the art that the same or similar deadtime optimization techniques and technologies can be applied to other types of circuits which have a power switch stage such as a Class-D audio amplifier, or a motor driver circuit.

Exemplary Embodiments

Figure 2:
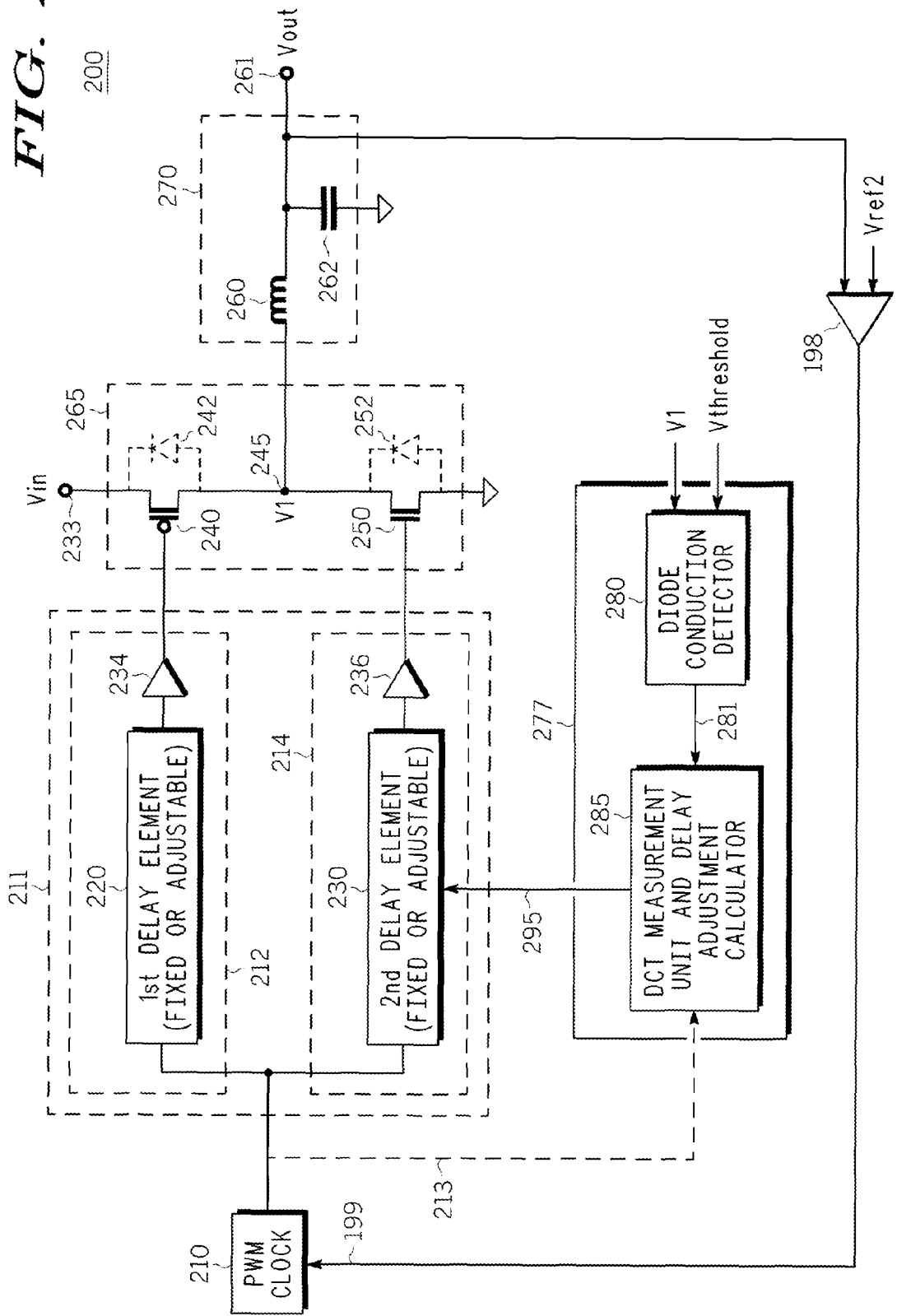
FIG. 2 is a circuit schematic which illustrates a DC-to-DC converter in accordance with an embodiment of the present invention.

FIG. 2 is a circuit schematic which illustrates a DC-to-DC converter 200 in accordance with an embodiment of the present invention The DC-to-DC converter 200 includes a DC/DC PWM clock 210 which generates a clock signal, a gate driver circuit 211, a power switch stage 265 which includes a first (high-side) transistor 240 and a second (low-side) transistor 250, an external LC filter 270 coupled between a first node 245 and a second node 261, and feedback loop 277 for reducing a deadtime interval in a voltage (V1) generated at the first node 245 by the power switch stage 265. The first transistor 240 is coupled to the first delay element 220, the first node 245 and a second node 233. The second transistor 250 is coupled to the second turn-on delay element 230, the first node 245 and ground. The external LC filter 270 includes an inductor 260 having an input coupled to the first node 245 and an output coupled to the second node 261, and a capacitor 262 coupled between the second node 261 and ground. The external LC filter 270 receives a voltage (V1) generated at a first node 245, and generates an output voltage (Vout) at the second node 261 based on the voltage (V1). Another feedback loop maintains the output voltage (Vout) at a desired level. Many of these same elements are described above the respect to the DC-to-DC converter in FIG. 1A, and for sake ob brevity, these elements will not be described here again.

The gate driver circuit 211 includes a first driver path 212 and a second driver path 214. The first driver path 212 is coupled between the clock 210 and the first transistor 240 and the second driver path 214 is coupled between the clock 210 and the second transistor 250. The driver paths 212, 214 can comprise either a fixed delay element or an adjustable (variable) delay element or both a fixed delay element and an adjustable (variable) delay element. As will be described in detail below, at least one of the delay elements 220, 230 is adjustable so that the relative delay between the delay element 220 and the delay element 230 can be continuously adjusted. In other words, the delay element 220 can be either fixed and/or adjustable, and correspondingly the delay element 230 can be either adjustable and/or fixed. The importance of these will be described in more detail below.

In the exemplary embodiment illustrated in FIG. 2, the delay element 220 is a fixed turn-off delay element and the delay element 230 is an adjustable or variable turn-on delay element. However, it will be appreciated that in another embodiment the delay element 220 can be an adjustable turn-off delay element and the delay element 230 can be a fixed turn-on element. Alternatively, delay elements 220, 230 could both be adjustable delay elements. In still other embodiments, the driver path 212 can include a fixed turn-off delay element and an adjustable turn-off delay element, and the driver path 214 can also include a fixed turn-on delay element and an adjustable turn-on delay element.

The fixed turn-off delay element 220 helps to ensure that there is some fixed amount of turn off delay with respect to the first transistor 240. The fixed turn-off delay element 220 skews the clock signal such that a command from the clock 210 is received at a relatively predictable time. The variable "turn-on" delay of the variable delay element 230 determines when the second transistor 250 will be turned on. The variable delay of the variable turn-on delay element 230 is continuously adjusted based on the control signal 295 and can vary between values less than or greater than a fixed delay of the fixed turn-off delay element 220. For example, in one implementation, the fixed delay can be fixed at a value between five nanoseconds and twenty nanoseconds.

When the clock signal is received by delay elements 220, 230, the delay elements 220, 230 delay the clock signal by an amount equal to their respective delays at that time. In this exemplary embodiment, the first delay element 220 generates a first delayed clock signal which is delayed by a fixed duration, an the second delay element 230 generates a second delayed clock signal which is delayed by a variable duration equal to the variable delay of the second delay element 230. In other words, when clock 210 sends the same command to the fixed turn-off delay element 220 and the variable turn-on delay element 230, the time at which that command reaches that first transistor 240 will be delayed by time determined by the fixed turn-off delay element 220 whereas, the time at which the command from the clock 210 reaches the second transistor 250 will be delayed by a variable delay determined by the variable turn-on element 230. As will be described below, the second transistor 250 receives a command from the clock 210 at a different time which varies depending upon the variable delay of the variable delay element 230 and this variable delay is continuously adjusted using control signal 295. The fixed turn off delay of the fixed delay element 220 should not be greater than the variable turn on delay of the variable delay element 230 otherwise a short-circuit could result. To prevent this, at startup or initialization, the delays are biased so that the delay of variable turn-on delay element 120 is greater than the delay of fixed turn-off delay element 220.

Figure 3A:
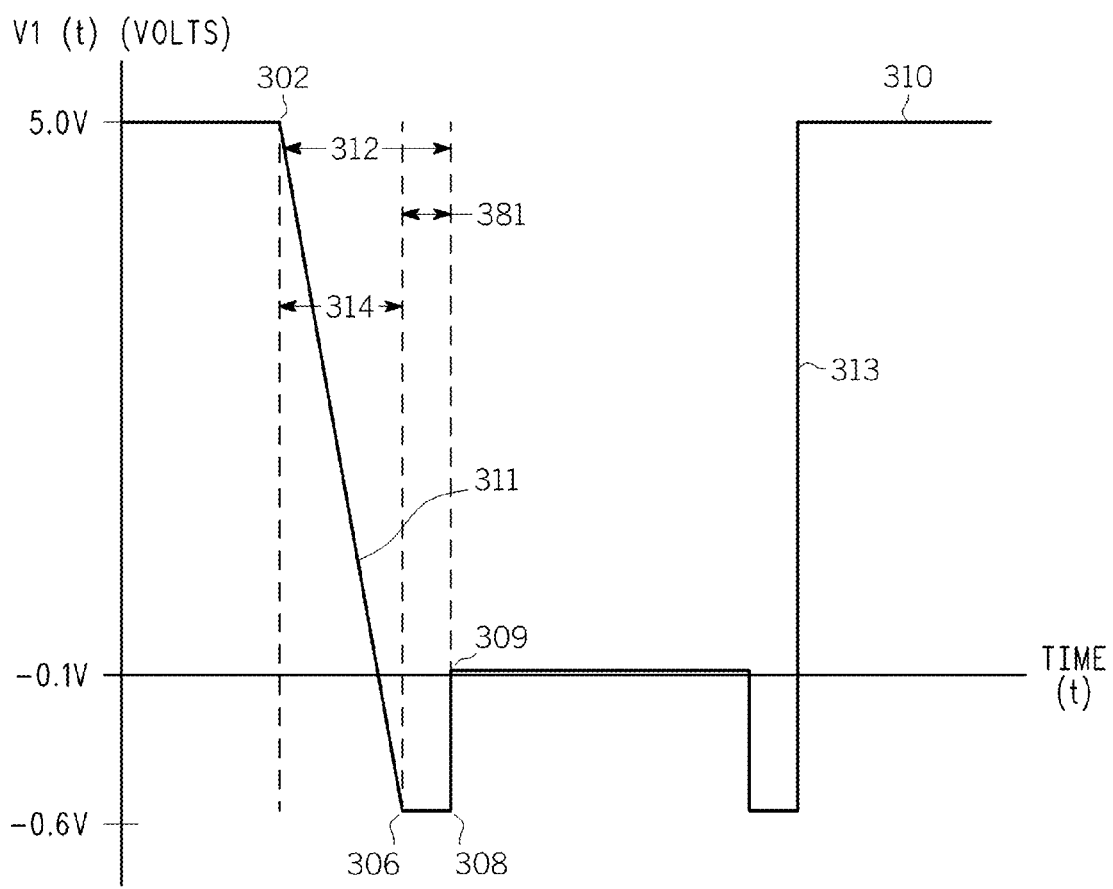
FIG. 3A is a graph which represent the voltage (V1) signal as a function of time (t) including how the voltage (V1) transitions during the deadtime interval prior to being adjusted.

FIG. 3A is a graph which represents the voltage (V1) signal 310 as a function of time (t) including how the voltage (V1) transitions 311 during the deadtime interval 312 prior to being adjusted. It will be appreciated by those skilled in the art that the voltage values illustrated in FIG. 3A are exemplary and that other voltage values are possible within the context of the invention. FIG. 3A shows a portion of the graph of FIG. 1C which illustrates the deadline interval 312 in greater detail. FIG. 3A illustrates the voltage (V1) before the diode conduction time (DCT) 381 is reduced to an optimized non-zero value.

The first transistor 240 receives, at its gate, a clock pulse of the first delayed clock signal from the first delay element 220. This causes the first transistor 240 to turn off and stop conducting at a first time (illustrated in FIG. 3A at time 302). The second transistor 250 receives, at its gate, the second delayed clock signal from the second delay element at a second time (illustrated in FIG. 3A at time 308). During the period 312 between the first time 302 (when he first transistor 240 turns off) and the third time 308 (when the second transistor 250 turns on), the deadtime interval 312 takes place. At the end of the deadtime interval 312, the second transistor 250 turns on and begins conducting at that third time (illustrated in FIG. 3A as time 308).

When the first transistor 240 initially turns off there is a period 314 where the inductor 260 and the capacitor 262 cause a current flow through diode 252 from the first node 245 to the second node 261 where the inductor 260 and capacitor 262 are coupled. The change in voltage (V1) 310 during this time (or slope of the line 311) is controlled based on the values of the inductor current. At the second time 306, the second transistor 250 has not yet turned on, but its parasitic diode 252 is conducting, and the voltage (V1) 310 falls to −0.6 volts. Between the second time 306 and the third time 308, the inductor 260 causes a current to flow through the parasitic diode 252 during a portion 381 of the deadtime interval 312 which can be referred to as a "diode conduction time (DCT)" and which is illustrated in FIG. 3A as the pulse in the voltage (V1) 310 that is marked with double headed arrow 381. The diode conduction time 381 lasts until the second transistor 250 turns on at the third time 308 at which point the voltage (v1) 310 increases to the low level of approximately −0.1 volts at a fourth time 309.

The DC-to-DC converter 200 also includes a feedback loop between the first node 245 and the second delay element 230 which comprise a control unit 277. The feedback loop ensures that the DCT portion 381 of deadtime interval 312 in continuously adjusted to an optimized value even as operating conditions continue to change. The feedback loop continuously adjusts the delay of the delay element 230 based on a control signal 295 generated by the control unit 277. The control unit 277 designed to: detect when the diode 252 is conducting (e.g., when voltage (V1) is lower than a certain value (Vthreshold)); measure a duration of the diode conduction time 381 (e.g., the portion 381 of the deadline interval 312 between the second time 306 and the third time 308) to generate a diode conduction time 381; and generate a control signal 295 for changing or adjusting a relative delay between the first delay element 220 and the second delay element 230. The functionality performed by the control unit 277 can be embodied in one or more circuits (analog or digital) or in one or more conventional processors with unique stored program instructions to implement the functions for continuously adjusting the relative delay between two or more delay elements. Further, it is expected that one of ordinary skill, when guided by the concepts and principles disclosed herein, will be readily capable of generating software instructions and programs and ICs for continuously adjusting the relative delay between two or more delay elements to change a diode conduction time to an optimized value.

In the exemplary embodiment illustrated in FIG. 2, the control unit 277 can be implemented using a diode conduction detector module 280 and a diode conduction time measurement unit and delay adjustment calculator (DCTMUDAC) unit 285 which may include a diode conduction measurement module (not shown), a storage element (not shown), and a delay adjustment module (not shown).

The diode conduction detector 280 receives inputs which include a threshold voltage (Vthreshold) and the voltage (V1) generated at the node 245. As illustrated in FIG. 3A, during the DCT 381 of the deadtime interval 312, the voltage (V1) falls to a negative level of −0.6 volts. In this exemplary implementation, the threshold voltage (Vthreshold) can be a fixed non-zero reference value, for example, −0.3 volts. The diode conduction detector 280 compares the voltage (V1) to the threshold voltage (Vthreshold), and when the voltage (V1) is less than the threshold voltage (Vthreshold), the diode conduction detector 280 generates a high "diode conduction time (DCT)" output signal 281 that is passed to the DCTMUDAC unit 285 to indicate that the diode 252 is conducting. By contrast, when the voltage (V1) is greater than or equal to the threshold voltage (Vthreshold), then the diode conduction detector 280 does not output the high DCT signal 281.

When the DCTMUDAC unit 285 receives the DCT signal 281, the diode conduction measurement module (not shown) of the DCTMUDAC unit 285 measures a diode conduction time (DCT) associated with the parasitic diode 252 of the second transistor 250. The storage element module (not shown) of the DCTMUDAC unit 285 stores the duration of the measured DCT 281 as a stored diode conduction time until the next clock cycle. In one implementation, the control signal 295 is triggered by clock signal (as represented by the dashed line arrow 231) form the clock 210. This way the DCTMUDAC unit 285 "knows" when the next clock cycle takes place since it receives the clock signal input. The clock signal input is illustrated by a dashed lien 213 to indicate that it is optional, and I only used in some embodiments where DCTMUDAC unit 285 needs a clock signal to trigger the control signal 295. When the delay adjustment module of DCTMUDAC unit 285 receives a clock signal 213 (or other indication that the next clock cycle is taking place after the first clock cycle), the delay adjustment module uses the stored DCT to generate and output a control signal 295 to the second delay element 230.

Figure 3B:
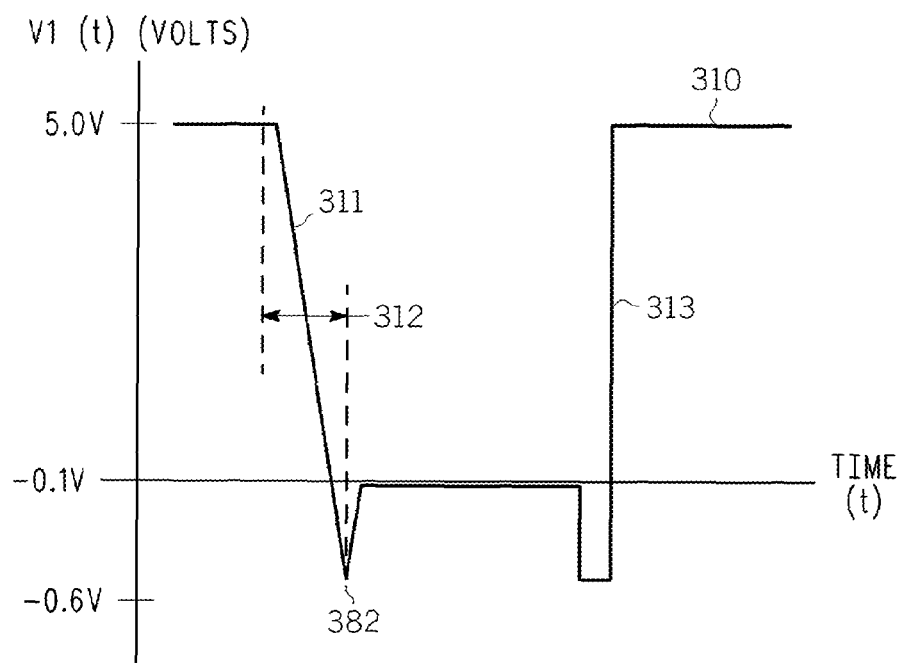
FIG. 3B is a waveform of voltage (V1) during a subsequent clock cycle or cycles after a settling time when the diode conduction timer (DCT) is reduced to an optimum non-zero value.

The control signal 295 continuously changes the relative delay between the first delay element 220 and the second delay element 230 to change or reduce the DCT 381 to an optimum or minimum non-zero value during a subsequent clock cycle (after the first clock cycle), as illustrated in FIG. 3B which will be described below. In this embodiment, the control signal 295 adjusts (e.g., increases or decreases) the variable delay of the variable delay element 230 to increase or decrease the relative delay between the fixed delay element 220 and the variable delay element 230. As will be explained below, by changing the relative delay between the fixed delay element 220 and the variable delay element 230, the DCT 281 is continuously driven to an optimized (e.g., small, non-zero) value during the next clock cycle or subsequent clock cycles. In practical implementations, it may take a few clock cycles to cause the DCT 381 to converge on the optimum non-zero value sine the adjustment of the DCT 281 is based on a feedback loop o "closed-loop control." Notably, the DCT 281 is continuously moved to a very small non-zero value (e.g., a value that approaches zero but does not reach zero) to reduce the amount of time the DCT to an optimum value. The DCT is not reduced to zero since this would result in a short circuit across the transistors 240, 250.

In one embodiment, the control signal 295 can be generated once every clock cycle to adjust or update the variable delay of the delay element 230 so that the DCT is optimized.

Therefore, if the DCT 281 is too large then the control signal 295 will reduce the variable delay of the variable delay element 230 in a direction to decrease or reduce the DCT during subsequent clock cycles(s). If the DCT 281 is too small (e.g., too close to zero), then the control signal 295 will increase the variable delay of the variable delay element 230 to increase the DCT during subsequent clock cycle(s).

FIG. 3B is a waveform of voltage (V1) during a subsequent clock cycle or cycles after a settling time when the DCT is reduced to an optimum non-zero value. During each clock cycle after the first clock cycle, the DCT will continue to exponentially converge to its optimal or minimized value until the control loop reaches a stable value. In contrast to FIG. 3A, where the DCT is represented by arrow 381 between the vertical dotted lines, in FIG. 3B the DCT has been reduced to an optimized value which is indicated at point 382. Because the duration of DCT is reduced, power is saved during the deadtime interval 312.

Figure 4:
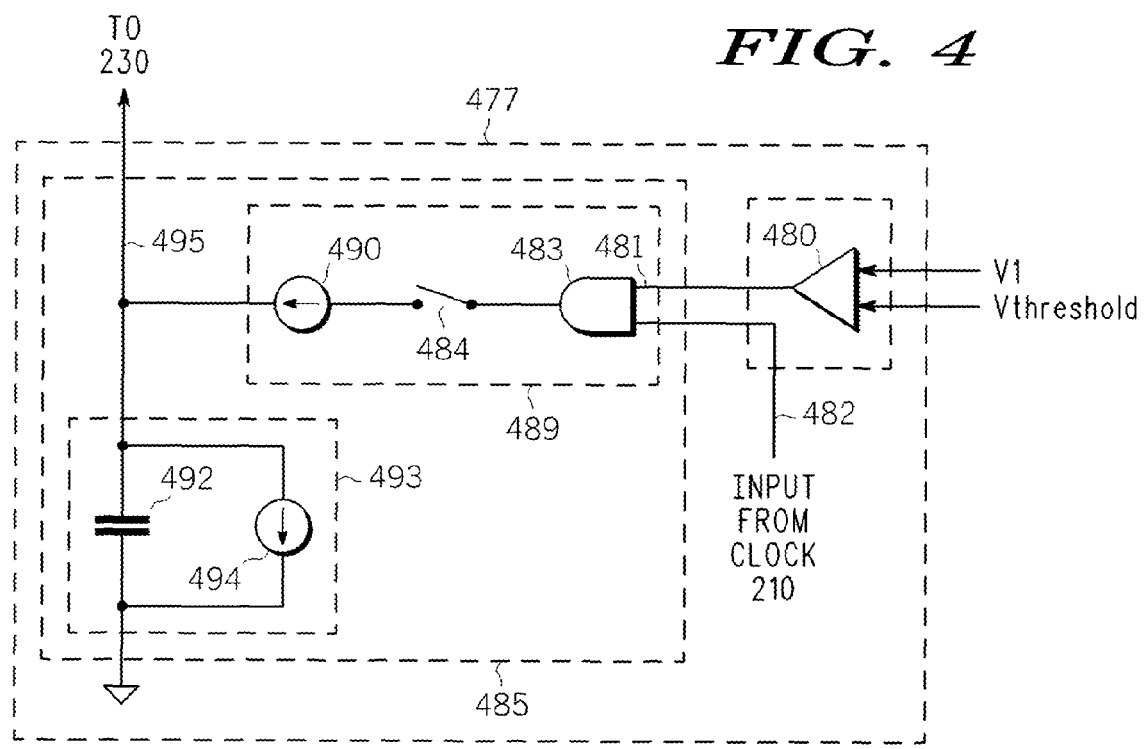
FIG. 4 is a circuit schematic which illustrates an implementation of a control unit of FIG. 2 in accordance with an embodiment of the present invention.

FIG. 4 is a circuit schematic which illustrates an implementation of the control unit 277 of FIG. 2 in accordance with an embodiment of the present invention. In this implementation, the diode conduction detector module 280 is implemented using a comparator 480 which receives the voltage (V1) and a threshold voltage (Vthreshold), and compares the voltage (V1) to the threshold voltage (Vthreshold). The comparator 480 generates a DCT signal 481 when the voltage (V1) is less than the threshold voltage (Vthreshold). The comparator 480 generates a high DCT signal 481 as long as the voltage (V1) is less than the threshold voltage (Vthreshold), and this high DCT signal 481 is generated for duration equal to the DCT.

Figure 5:
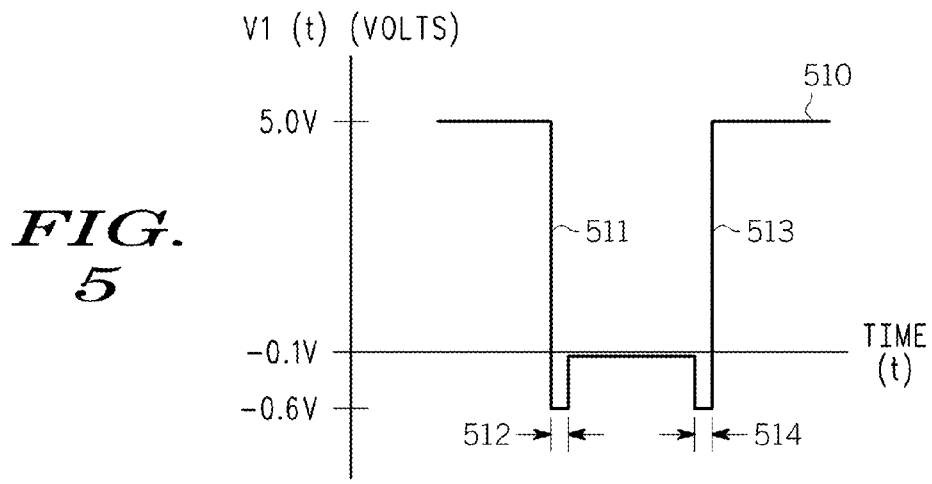
FIG. 5 is a graph which represents the voltage (V1) signal as a function of time (t) including a negative-going deadline interval on the leading edge of the V1 signal and another negative-going deadline interval on the trailing edge of the V1 signal.

In this particular implementation, the DCTMUDAC unit 285 can be implemented using a diode conduction measurement circuit 489, and diode conduction storage and a delay adjustment (DCSDA) circuit 493. The diode conduction measurement (DCM) circuit 489 measure the DCT. The DCM circuit 493 can be implemented with a circuit which includes a switch 484 is coupled between an AND gate 483 and a current source 490 where the switch 484 and the AND gate 483 turns on or off the current source 490. The switch 484 closes in response to the high DCT signal 481 and provides an output signal to the first current source 490 that turns on the current source 490 to provide a charging current to the DCSDA circuit 493. In one implementation, the AND gate 483 receives the output form the comparator 480 and an input from the clock 210 of FIG. 2, and generates an output signal when the DCT signal 481 and the clock signal are simultaneously at a high level. When the DCT signal 481 is high and the input from the clock is also high, the AND gate 483 generates a high output (e.g., logical 1) which causes the switch 484 to close. Referring to FIG. 5, the AND gate 483 helps ensure that the control loop 477 processes the DCT signal 481 only on the leading edge 511 of the voltage (V1) signal and not on the trailing edge 513 of the voltage (V1) signal. This way, the delay adjustment for the DCT signal 481 is only attributable to the DCT of the deadtime interval 512 on leading edge 511 of the clock.

In one implementation, the DCSDA circuit 493 include a capacitor 492 with a small discharge current source 494 coupled in parallel to the capacitor 492. The current signal from the first current source 490 causes the capacitor 492 to begin accumulating charge thereby increasing the voltage across the capacitor 492. In one implementation, every nanosecond the signal for the DCT time 481 is high and the first current source 490 is a one hundred microampere current source, then the capacitor 492 chares up by 10 millivolts per nanosecond (with a 10 pF capacitor). Therefore, if the diode conduction time is 10 nanoseconds then the voltage stored on the capacitor 492 will be increased by 100 millivolts. The voltage stored on the capacitor 492 is changed by an amount proportional to the pulse width of the DCT portion 381 of the deadtime interval 312 (i.e., the duration between the second time 306 and the third time 308), and represents a new value of the variable delay that will cause the diode conduction time 381 to converge to a minimum non-zero value. In other words, the voltage stored on the capacitor 492 is directly proportional to the delay value of the delay element 230 on the next clock cycle.

The current source 494 is a fixed direct current source which is coupled in parallel with the capacitor 492. The fixed DC current source 494 unconditionally discharges the capacitor 492 by a small fixed amount once each clock cycle (e.g., 1 millivolts per clock cycle). In one implementation, if current source 494 is a 1 microampere current source, the current source 494 will then discharge the capacitor 492 by one millivolts every clock cycle, for example on every clock pulse, so that eventually the diode conduction time 481 converges to produce a variable delay having a final value of one tenth of a nanosecond when the control loop finally settles.

The control signal 495 adjusts the variable delay of the variable delay element 230 to drive the diode conduction time 381 toward an optimized non-zero value. For example, when voltage on the capacitor 492 decreases, this causes the control loop to increase the delay of the adjustable delay element 230. When the voltage stored on capacitor 492 increases, this causes the control loop to decrease the delay of the adjustable delay element 230.

Figure 6:
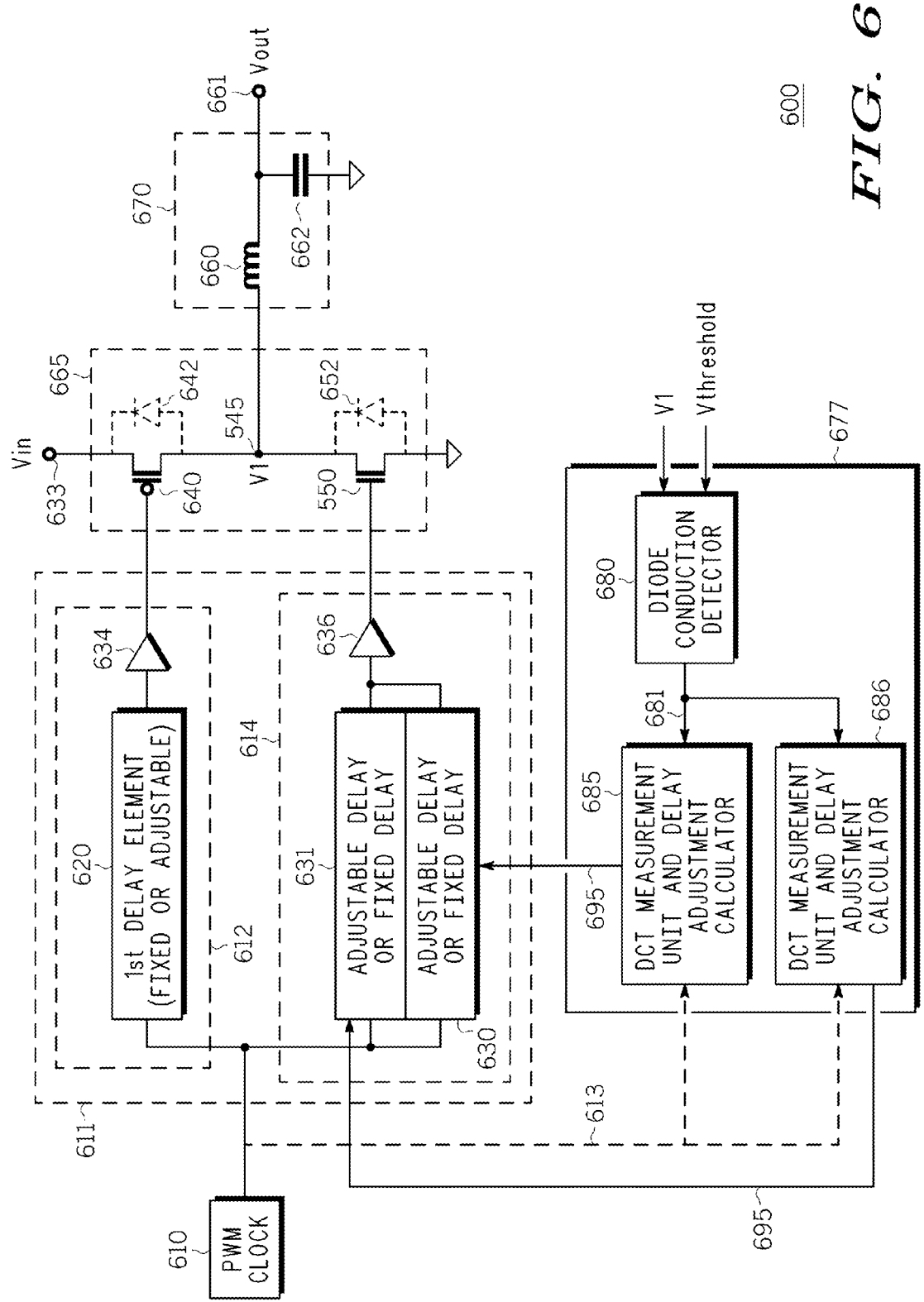
FIG. 6 is a circuit schematic which illustrates a DC-to-DC converter in accordance with an embodiment of the present invention.

FIG. 3A illustrates a situation where the deadline interval 312 is a negative pulse which occurs on the leading edge of the voltage (V1) signal 310. However, depending on the operational conditions in the DC-to-DC converter 200, deadtime intervals can generally occur as either negative or positive pulses, and these pulses can correspondingly occur on either the leading or trailing edge of the voltage (V1) signal. As will be described below with the reference for FIGS. 5, 7A and 7B, in most scenarios, different deadtime durations can occur on both the leading and the trailing edge of the voltage (V1) signal, and each of the deadtime intervals includes it own DCT. FIGS. 6 and 8 illustrate other additional embodiments of the invention which can be implemented to drive the different DCT(s) illustrated in FIGS. 5, 7A and 7B towards optimized non-zero values. These additional embodiments operate similarly to the embodiments of FIGS. 2 and 3, but also include additional control units 277, 377 and/or variable delay elements.

FIG. 5 is a graph which represents the voltage (V1) signal 510 as a function of time (t) including a negative deadline interval 512 on the leading edge 511 of the V1 signal 510 and another negative deadtime interval 514 on the trailing edge 513 of the V1 signal 510. It will be appreciated by those skilled in the art that the voltage values illustrated in FIG. 5 are exemplary and that other voltage values are possible within the context of the invention. It will also be appreciated by those skilled in the art that the pulse widths 512, 514 can be different even though they are shown as having the same pulse width. In FIG. 5, the voltage (V1) signal 510 begins at 5.0 volts, and then transitions along the leading edge 511 to −0.6 volts and remains at −0.6 volts during a negative deadtime interval 512 before the voltage (V1) signal 510 eventually rises to the low level of −0.1 volts. This scenarios is described above. During the deadtime interval 514, the voltage (V1) signal 510 falls to a value of −0.6 volts before the voltage (V1) signal 510 again rises back up to approximately 5 volts. The circuits 200, 300 in FIGS. 2 and 3, respectively, can be used to adjust the DCT of either deadtime interval 512, 514, but not both simultaneously. As will now be described with reference to FIG. 6, to reduce the DCTs associated with both of the deadtime intervals 512, 514, in one embodiment, and additional diode conduction time measurement unit and delay adjustment calculator (DCTMUDAC) unit 686 can be included in the control unit 677 and an additional variable delay element 631 can be included in the driver path 14.

FIG. 6 is a circuit schematic which illustrates a DC-to-DC converter 600 in accordance with an embodiment of the present invention. Many of these sane elements are describe above with respect to the DC-to-DC converter in FIG. 2, and for sake of brevity, these elements will not be described here again. As described above with respect to FIG. 2, the variable delay element 230 (illustrate in FIG. 6 as delay element 630), and the DCTMUDAC unit 285 (illustrated in FIG. 6 as DCT-MUDAC unit 685) can be used to optimize the DCT associated with the deadtime interval 512.

To optimize the DCT associated with the deadline interval 514, the driver path 614 includes the additional variable delay element 631, and the control unit 677 includes the additional DCTMUDAC unit 686. The DCTMUDAC units 685, 686 operate in parallel such that both receive the same signal 681 form the diode conduction detector module 680. Adjustable delay element 630 receives a control signal 695 from DCT-MUDAC unit 685, whereas adjustable delay element 631 receives a control signal 696 from DCTMUDAC unit 686. Alternatively, those skilled in the art will appreciate that the delay elements 630, 631 may be implemented using a single variable delay element 230 that is switched in a manner to control both deadtimes 512, 514. Clock signals 613 can be provided to each of the delay elements 630, 631 in the driver path 614.

In the exemplary embodiment illustrated in FIG. 6, the delay element 631 in the driver path 614 is an adjustable or variable turn-on delay element, and the variable "turn-on" delay of the variable delay element 631 determines when the second transistor 650 will be turned on. The variable delay of the variable turn-on delay element 631 is continuously adjusted based on the control signal 696. The delay element 631 delays the clock signal by an amount equal to its delay to generate a third delayed clock signal which is delayed by a variable delay of the delay element 631. The second transistor 650 receives, at its gate, the third delayed clock signal from the variable delay element 631, but does not turn on immediately. At some point during the deadtime interval 514, the second transistor 650 eventually turn on and begins conducting. The DCT of the deadtime interval 514 lasts until the second transistor 650 turns on and the voltage (V1) signal 510 increases to the high level of approximately 5.0 volts.

When the DCTMUDAC unit 686 receives the DCT signal 681, a diode conduction measurement module of the DCT-MUDAC unit 686 measures a DCT associated with the parasitic diode 652 of the second transistor 650. The storage element module of the DCTMUDAC unit 686 stores the duration of the measured DCT 681 as a stored diode conduction time until the next clock cycle. In one implementation, the control signal 696 is triggered by clock signal (as represented by the dashed line arrow 613) from the clock 610. This way the DCTMUDAC unit 686 "knows" when the next clock cycle takes place. The clock signal input is illustrated by a dashed line to indicate that it is optional, and is only used in some embodiments where DCTMUDAC unit 686 needs a clock signal to trigger the control signal 696. When the delay adjustment module of DCTMUDAC unit 686 receives a clock signal (or other indication that the next clock cycle is taking place after the first clock cycle), the delay adjustment module uses the stored DCT to generate and output the control signal 696 to the delay element 631. The control signal 696 continuously changes the relative delay between the delay element 620 and the delay element 631 to change or reduce the DCT to an optimum or minimum non-zero value during a subsequent clock cycle (after the first clock cycle), as described above.

Thus, in the embodiment illustrated in FIG. 6, another DCTMUDAC unit 686 can be coupled to the DCD module 680 to continuously adjust the variable turn-on delay element 631 to optimize the DCT of the deadline interval 514 on the trailing edge 513 of voltage (V1) signal 510.

Figure 7A:
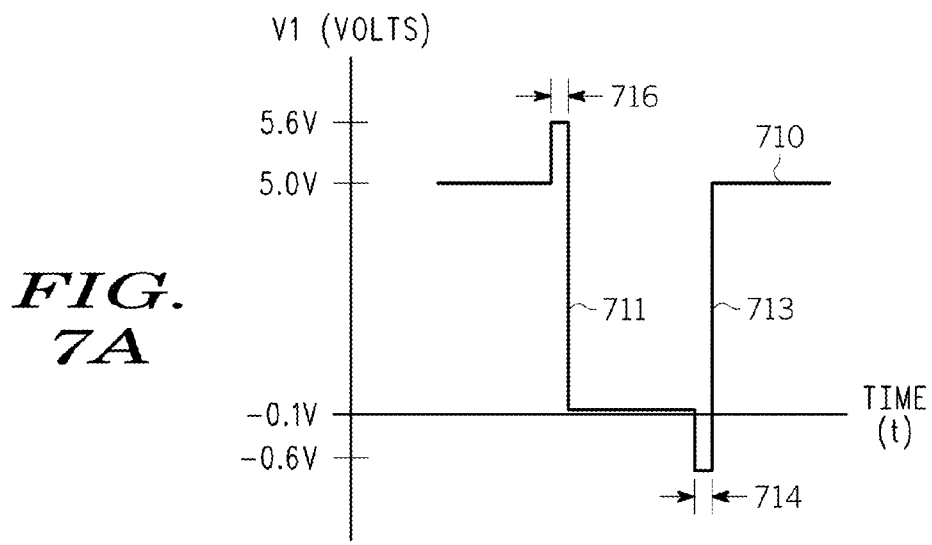
FIG. 7A is a graph which represents the voltage (V1) signal as a function of time (t) including a positive-going deadtime interval on the leading edge of the V1 signal and a negative-going deadtime interval on the trailing edge of the V1 signal.
Figure 8:
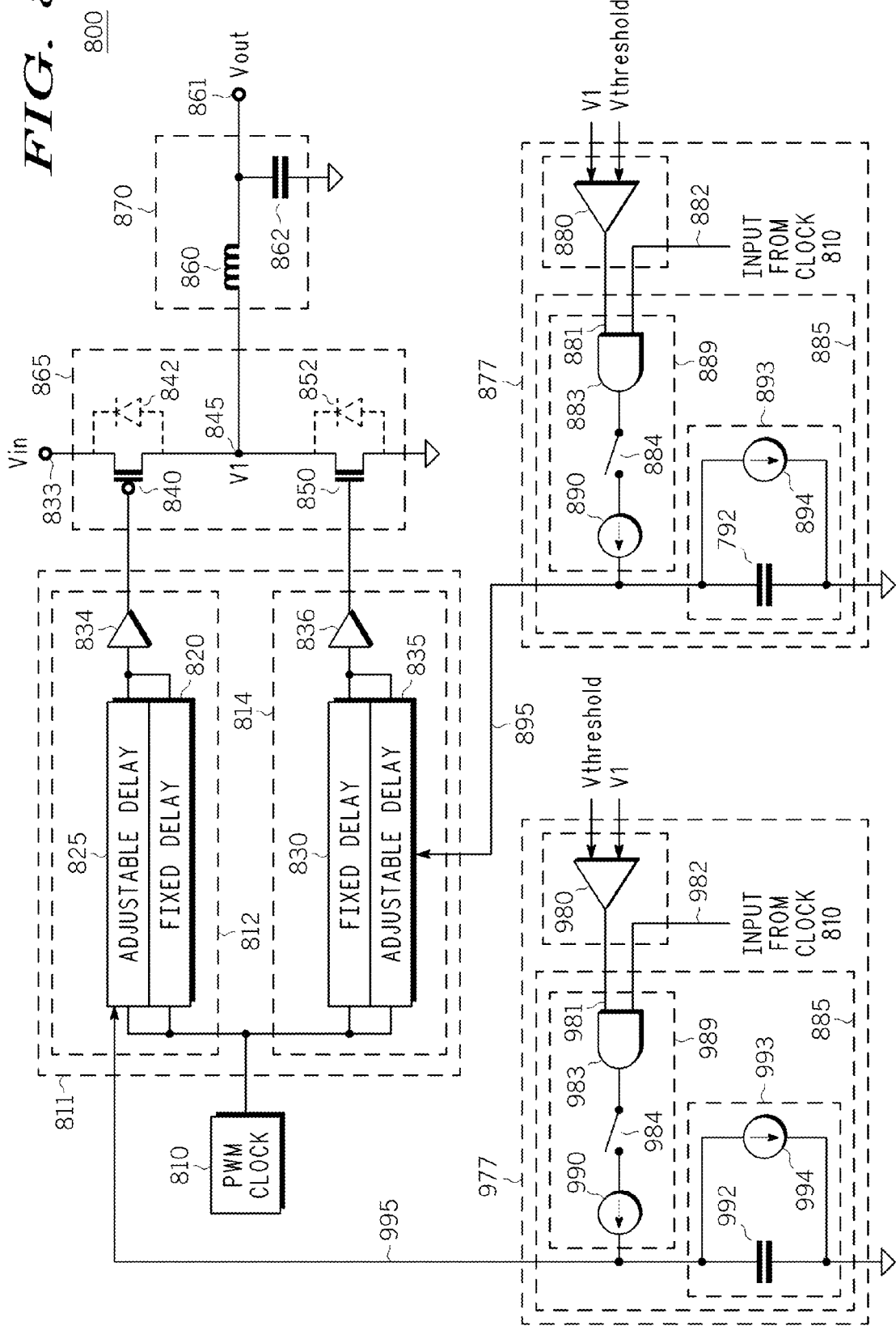
FIG. 8 is a circuit schematic which illustrates a DC-to-DC converter in accordance with an embodiment of the present invention.

FIG. 7A is a graph which represents the voltage (V1) signal 710 as a function of time (t) including a positive deadtime interval 716 on the leading edge 711 of the V1 signal 710 and a negative deadtime interval 714 on the trailing edge 713 of the V1 signal 710. The scenario illustrated in FIG. 7A represents a situation that can occur when the DC-to-DC converter is absorbing power. As above, the voltage values illustrated in FIG. 7A are exemplary and that other voltage values are possible within the context of the invention. In FIG. 7A, the voltage (V1) signal 710 begins at 5.0 volts, and then spikes to a value of approximately 5.6 volts during the positive deadtime interval 716. The voltage (V1) signal 710 then transitions along the leading edge 711 down to −0.1 volts. Thereafter, the voltage (V1) signal 710 drops to −0.6 volts and remains at −0.6 volts during the negative deadtime interval 714 before the voltage (V1) signal 510 rises back up to approximately 5 volts.

Figure 7B:
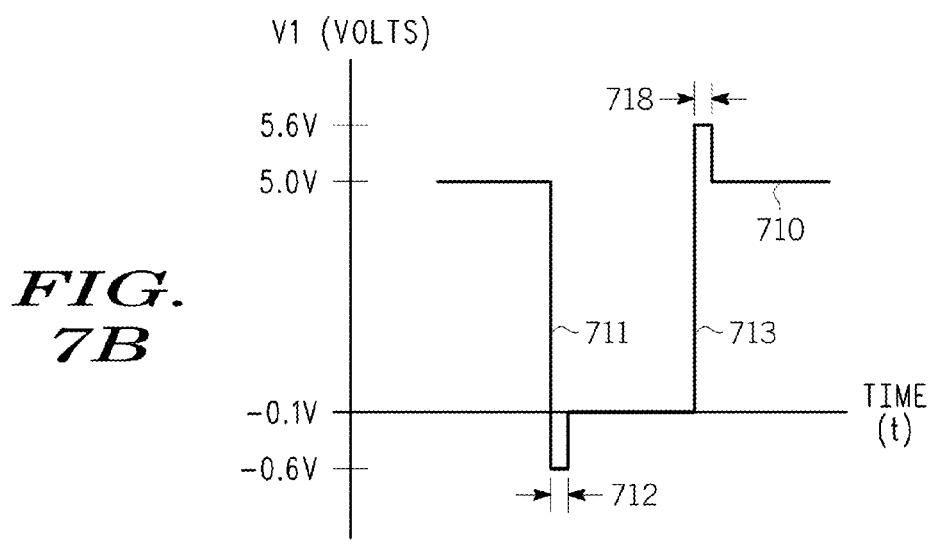
FIG. 7B is a graph which represents the voltage (V1) signal as a function of time (t) including a negative-going deadtime interval on the leading edge of the V1 signal and a positive-going deadtime interval on the trailing edge of the V1 signal.

FIG. 7B is a graph which represents the voltage (V1) signal 710 as a function of time (t) including a negative deadtime interval 712 on the leading edge 711 of the V1 signal 710 and a positive deadtime interval 718 on the trailing edge 713 of the V1 signal 710. As above, the voltage values illustrated in FIG. 7B are exemplary and that other voltage values are possible within the context of the invention. With respect to FIG. 7A, it should be noted that either deadtime interval 712 or deadtime interval 716 will occur, but both will not occur simultaneously. Similarly, either deadtime interval 714 or deadtime interval 718 will occur, but both will not occur simultaneously. In FIG. 7B, the voltage (V1) signal 710 begins at 5.0 volts, and then transitions along the leading edge 711 to −0.6 volts and remains at −0.6 volts during a negative deadtime interval 712 before the voltage (V1) signal 710 eventually rises to the low level of −0.1 volts and stays at −0.1 volts until the trailing edge 713 where the voltage (V1) signal 710 spikes up to 5.6 volts during the deadtime interval 718 before eventually returning to 5.0 volts.

FIG. 8 is a circuit schematic which illustrates to DC-to-DC converter 800 in accordance with an embodiment of the present invention. Techniques for simultaneously optimizing the DCTs associated with the deadtime intervals 512, 514 have been described above with respect to FIG. 6. FIG. 8 describes techniques for simultaneously optimizing the DCTs associated with the deadtime intervals 716, 714 illustrated in FIG. 7A, where one deadtime interval 716 is characterized by a positive pulse and another deadtime interval 714 is characterized by a negative pulse. Although not described, similar techniques can be used for simultaneously optimizing the DCTs associated with the deadtime intervals 712, 718 illustrated in FIG. 7B, where one deadtime interval 718 is characterized by a positive pulse and another deadtime interval 712 is characterized by a negative pulse.

In the operating scenario shown in FIG. 7A, different circuits are required to optimize the negative and positive deadtime intervals 714, 716. As illustrated in FIG. 8, two feedback loops are provided; one is for continuously adjusting the delay 825 of driver path 812 before turning on the transistor 840 to optimize the DCT associated with the positive deadtime interval 716 on the leading edge 711 of the voltage (V1) signal 710, and another is for continuously adjusting the delay 835 of driver path 814 before turning off the transistor 850 to optimize the DCT associated with the negative deadtime interval 714 on the trailing edge 713 of the voltage (V1) signal 710.

Many of these same elements in FIG. 8 are described above with respect to the described here again. As described above with respect to FIGS. 2, 4 and 5, the variable delay element 230, 530/531 (illustrated in FIG. 8 as delay element 835), and the control unit 277, 377 (illustrated in FIG. 6 as control unit 877) can be used to optimize the DCT associated with the negative deadtime interval 714. To optimize the DCT associated with the positive deadtime interval 716, the driver path 812 includes an additional variable delay element 825, and another feedback loop is added with another control unit 977. Thus, in this embodiment, the driver paths 812, 814 both include an variable turn-on delay element 825, 835 and a fixed turn-off delay element 820, 830.

The additional control unit 977 is similar to the control unit 877 except that the inputs to comparator 980 are reversed so that the DCT associated with a positive deadtime interval 716 or 718 can be detected and measured. For example, the comparator 980 receives inputs which include a threshold voltage (Vthreshold) and the voltage (V1) generated at the node 845. As illustrated in FIG. 7A, during the deadtime interval 716, the voltage (V1) spikes to a level of 5.6 volts. In one exemplary implementation, the threshold voltage (Vthreshold) can be a reference value, for example, 5.1 volts. The comparator 980 compares the voltage (V1) to the threshold voltage (Vthreshold), and when the voltage (V1) is greater than the threshold voltage (Vthreshold), the comparator 980 generates a high "diode conduction time (DCT)" output signal 981. By contrast, when the voltage (V1) is less than or equal to the threshold voltage (Vthreshold), then the comparator 980 does not output a high DCT signal 981.

The DCTMUDAC unit 985 includes a DCM circuit 989, and a diode conduction storage and a delay adjustment (DCSDA) circuit 993. The DCM circuit 989 measures the DCT. The DCM circuit 993 can be implemented with a circuit which includes an AND gate 983 coupled to a switch 984 which turns on or off a current source 990. In one implementation, the AND gate 983 receives the DCT signal 981 from the comparator 981 and an input 982 from the clock 810, and generates a high output signal when the DCT signal 981 and the clock signal are simultaneously at a high level. In other words, when the DCT signal 981 is high and the input from the clock is also high, the AND gate 983 generates a high output signal (e.g., logical 1) which causes the switch 984 to close. The AND gate 983 helps ensure that the control loop 977 processes the DCT signal 981 only on the leading edge 711 of the voltage (V1) signal 710 and not on the trailing edge 713 of the voltage (V1) signal 710. This way, the delay adjustment for the DCT signal 981 is only attributable to the leading edge 711 of the clock.

The switch 984 closes in response to the high DCT signal 981 and provides an output signal to the first current source 990. The output signal turns on the current source 990 to provide a charging current to the DCSDA circuit 993. In this implementation, the DCSDA circuit 993 includes a capacitor 992 with a discharge current source 994 coupled in parallel to the capacitor 992.

The current signal from the first current source 990 causes the capacitor 992 to begin accumulating charge thereby causing a voltage to develop across the capacitor 992. The voltage stored on the capacitor 992 is proportional to the pulse width of the DCT portion of the deadtime interval 716, and represents a new value of the variable delay that will cause the DCT to converge to a minimum non-zero value. In other words, the voltage stored on the capacitor 992 is directly proportional to the delay adjustment (e.g., the amount of time the delay will be adjusted up or down) of the delay element 825 on the next clock cycle.

The current source 994 is a fixed direct current source which is coupled in parallel with the capacitor 992. The fixed DC current source 994 unconditionally discharges the capacitor 992 by a fixed amount once each clock cycle.

The control unit 977 outputs a control signal 995 to adjust the delay of the delay element 825 in the driver path 812 to optimize the DCT associated with the positive deadtime interval &16. The control signal 995 adjusts the variable delay of the variable delay element 825 to drive the diode conduction time associated with deadtime interval 716 towards an optimized non-zero value. For example, when voltage on the capacitor 992 decreases, this causes the control loop to increase the delay of the delay element 825. When the voltage stored on capacitor 992 increases, this causes the control loop to decrease the delay of the adjustable delay element 825.

A similar circuit can be modified to simultaneously optimize the DCTs associated with the deadtime intervals 712, 718 illustrated in FIGS. 7B. In this case, the circuit in FIG. 8 would be modified to detect the positive deadtime interval 718 on the trailing edge 713 of the voltage (V1) signal 710. For sake of brevity the details of this circuit will not be described herein.

While at least one example embodiment has been presented in the forgoing detailed description, it should be appreciated that a vast number of variations exist. It should also be appreciated that the example embodiment of embodiments described herein are not intended to limit the scope, applicability, or configuration of the claimed subject matter in any way. Rather, the forgoing detailed description will provide those skilled in the art with a convenient roadmap for implementing the described embodiment or embodiments. For example, although a circuit implementation is described with reference to FIGS. 3 and 8, it will be appreciated by those of ordinary skill in the art that the same concepts and methods can be implemented in a digital architecture in which the feedback loop is implemented using a computer and different computer modules, and that the adjustable delay element 230 is implemented using a digital-to-analog converter. For instance, in one implementation, the control loop 277 in FIG. 2 could be implemented using a computer with a timer that counts or measures how long the voltage (V1) is negative, and then before the next clock cycle occurs, continuously adjusts delay of the digital-to-analog converter to optimized diode conduction time during subsequent clock cycles.

It should also be understood that various changes can be made in the function and arrangement of elements without departing from the scope defined by the claims, which includes known equivalents and foreseeable equivalents at the time of filing this patent application.

What is claimed is:

1. A method, comprising:
providing a clock signal to a first delay element and a second delay element;
generating a first voltage (V1) which includes a deadtime interval, wherein the deadtime interval comprises a pulse;
detecting the pulse during a first clock cycle, and measuring a duration of the pulse to generate a diode conduction time; and
generating a control signal based on the diode conduction time, wherein the control signal changes a relative delay between the first delay element and the second delay element to change the diode conduction time to an optimum non-zero value during a subsequent clock cycle after the first clock cycle.

2. A method according to claim 1, wherein the step of providing a clock signal to a first delay element and a second delay element, comprises:
providing a clock signal to a first delay element to generate a first delayed clock signal and a second delay element to generate a second delayed clock signal.

3. A method according to claim 2, further comprising the steps of:

driving a first transistor with the first delayed clock signal to generate a first output signal, wherein the first transistor turns off and stops conducting in response to the first delayed clock signal at a first time; and driving a second transistor with the second delayed clock signal at a second time and turns on to begin conducting in response to the second delayed clock signal at the third time to generate a second output signal, wherein the second transistor has a parasitic diode associated therewith which conducts a current during a portion of the deadtime interval to cause the pulse in the first voltage (V1) and wherein the second transistor begins conducting in response to the second delayed clock signal at a third time.

4. A method according to claim 3, wherein the step of detecting the pulse (481), comprises:

comparing the first voltage (V1) to a threshold voltage (Vthreshold), and generating a diode conduction time output signal when the first voltage (V1) is less than the threshold voltage (Vthreshold).

5. A method according to claim 3, further comprising the step of:

storing the measured diode conduction time as a stored diode conduction time until the next clock cycle.

6. A method according to claim 3, wherein the step of generating a first voltage (V1) comprises:

combining the first output signal and the second output signal to generate the first voltage (V1), wherein the first voltage (V1) includes the deadtime interval, and wherein the deadtime interval occurs between the first time and the third time and comprises a pulse between the second time and the third time.

7. A method according to claim 5, wherein the first delay element comprises a first fixed delay element which delays the first delayed clock signal by a fixed duration, and wherein the second delay element comprises a second variable delay element which delays the clock signal by a variable delay, and wherein the step of generating a control signal, comprises:

generating a control signal based on the stored diode conduction time during the first clock cycle, wherein the control signal changes the variable delay of the second variable delay element to change the relative delay between the first fixed delay element and the second variable delay element to change the diode conduction time to the optimum non-zero value during the next clock cycle after the first clock cycle.

8. A method according to claim 7, wherein the step of generating a control signal, comprises:

generating a control signal based on the stored diode conduction time during the first clock cycle, wherein the control signal decreases the variable delay of the second variable delay element to decrease the diode conduction time during the next clock cycle.

9. A method according to claim 7, wherein the step of generating a control signal, comprises:

generating a control signal based on the stored diode conduction time during the first clock cycle, wherein the control signal increases the variable delay of the second variable delay element to increase the diode conduction time during the next clock cycle.

10. An apparatus for reducing a deadtime interval in a first voltage (V1) generated at a first node of the apparatus, comprising:

a clock which generates a clock signal;

a first delay element coupled to the clock and a second delay element coupled to the clock;

a first transistor which receives a first delayed clock signal from the first delay element and generates a first output signal;

a second transistor which receives a second delayed clock signal from the second delay element and generates a second output signal, wherein the first output signal is combined with the second output signal at a first node to generate a first voltage (V1) which includes a deadtime interval, wherein a portion of the deadtime interval comprises a pulse; and a control unit coupled between the first node and the second delay element, wherein the control unit is designed to detect, during a first clock cycle, the pulse; measure a duration of the pulse to generate a diode conduction time, and generate a control signal, based on the diode conduction time, which changes a relative delay between the first delay element and the second delay element.

11. An apparatus according to claim 10, wherein the control signal changes the relative delay between the first delay element and the second delay element to change the diode conduction time during the next clock cycle after the first clock cycle.

12. An apparatus according to claim 10, further comprising a driver circuit which comprises:

a first driver path comprising: the first delay element, wherein the first delay element is designed to generate the first delayed clock signal which is delayed by a fixed duration; and a second driver path comprising: the second delay element, wherein the second delay element has a variable delay associated therewith and is designed to generate the second delayed clock signal which is delayed by a variable duration equal to the variable delay.

13. An apparatus according to claim 10, wherein the first delay element comprises a first fixed delay element, and wherein the second delay element comprises a second variable delay element, and wherein the control signal adjusts the variable delay associated with the second variable delay element to change the relative delay between the first fixed delay element and the second variable delay element to change the diode conduction time to a optimum non-zero value during a next clock cycle after the first clock cycle.

14. An apparatus according to claim 10, wherein the control unit comprises:

a diode conduction detector module designed to receive the first voltage (V1) and a threshold voltage (Vthreshold), compare the first voltage (V1) to the threshold voltage (Vthreshold), and generate a diode conduction time output signal when the first voltage (V1) is less than the threshold voltage (Vthreshold).

15. An apparatus according to claim 11, wherein the control signal changes the relative delay between the first delay element and the second delay element to change the diode conduction time to a optimum non-zero value during the next clock cycle after the first clock cycle.

16. An apparatus according to claim 12, wherein the first transistor is coupled to the first delay element, the first node and a second node, and receives the first delayed clock signal at a gate of the first transistor, and turns off and stops conducting in response to the first delayed clock signal at a first time, and wherein the second transistor is coupled to the second delay element, the first node and ground, and receives the second delayed clock signal at a gate of the second transistor at a second time, wherein the second transistor turns on and begins conducting in response to the second delayed clock signal at a third time, wherein the deadtime interval occurs between the first time and the third time, and wherein the second transistor has a parasitic diode associated therewith which conducts a current for a portion of the deadtime interval between the second time and the third time to cause the pulse in the deadtime interval of the first voltage (V1).

17. An apparatus according to claim 14, wherein the first delay element comprises a first fixed delay element, and wherein the second delay element comprises a second variable delay element, and wherein the control unit further comprises:
- a diode conduction measurement module designed to receive diode conduction time output signal, and measure the diode conduction time;
- a storage element designed to store the measured diode conduction time as a stored diode conduction time until the next clock cycle; and
- a delay adjustment module designed to use the stored diode conduction time during the next clock cycle to change the relative delay between the first fixed delay element and the second variable delay element to change the diode conduction time to the optimum non-zero value during the next clock cycle after the first clock cycle.

18. An apparatus according to claim 17, wherein the delay adjustment module is designed to use the stored diode conduction time during the next clock cycle to adjust the variable delay associated with the second variable delay element to change the relative delay between the first fixed delay element and the second variable delay element to change the diode conduction time to the optimum non-zero value during the next clock cycle after the first clock cycle.

19. An apparatus according to claim 18, wherein the delay adjustment module is designed to use the stored diode conduction time during the next clock cycle to decrease the relative delay between the first fixed delay element and the second variable delay element to decrease the second variable delay associated with the variable delay element to decrease the diode conduction time during the next clock cycle.

20. An apparatus according to claim 18, wherein the delay adjustment module is designed to use the stored diode conduction time during the next clock cycle to increase the relative delay between the first fixed delay element and the second variable delay element to increase the variable delay associated with the second variable delay element to increase the diode conduction time during the next clock cycle.

* * * * *